US009414353B2

(12) United States Patent
Karttaavi et al.

(10) Patent No.: US 9,414,353 B2
(45) Date of Patent: Aug. 9, 2016

(54) APPARATUS AND METHOD FOR ANTENNA ALIGNMENT

(71) Applicant: Nokia Technologies Oy, Espoo (FI)

(72) Inventors: Timo Petteri Karttaavi, Espoo (FI); Likka Hermanni Hakala, Helsinki (FI); Mauri Honkanen, Tampere (FI); Aarno Tapio Parssinen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/528,365

(22) Filed: Oct. 30, 2014

(65) Prior Publication Data
US 2015/0223195 A1    Aug. 6, 2015

Related U.S. Application Data

(63) Continuation of application No. 13/381,319, filed as application No. PCT/EP2009/004728 on Jun. 30, 2009, now Pat. No. 8,892,133.

(51) Int. Cl.
*H04W 64/00* (2009.01)
*G01S 1/02* (2010.01)
(Continued)

(52) U.S. Cl.
CPC ............ *H04W 64/006* (2013.01); *G01S 3/046* (2013.01); *G01S 3/14* (2013.01); *G01S 13/74* (2013.01); *H04B 17/002* (2013.01); *H04B 17/27* (2015.01); *H04W 4/02* (2013.01)

(58) Field of Classification Search
CPC ............ G01S 1/02; G01S 1/44; G01S 3/14; H04B 17/27; H04W 72/048
USPC .................. 455/457, 41.2, 517; 343/718, 757
See application file for complete search history.

(56) References Cited

U.S. PATENT DOCUMENTS 5,347,286 A    9/1994 Babitch
7,307,595 B2 *  12/2007 Schantz et al. ............... 343/718
(Continued)

FOREIGN PATENT DOCUMENTS

CN        1343381 A     4/2002
CN     201 233 956 Y    5/2009
(Continued)

OTHER PUBLICATIONS

International Search Report and Written Opinion for Application No. PCT/EP2009/004728 dated Nov. 18, 2009.
(Continued)

*Primary Examiner* — William Nealon
(74) *Attorney, Agent, or Firm* — Alston & Bird LLP

(57) ABSTRACT

Apparatus comprising a first antenna configured to receive alignment signalling from a first transmitter over a first communication channel, the first communication channel having a first set of characteristics, and a second antenna configured to exchange data w.th a second transmitter over a second communication channel, the second communication channel having a second different set of characteristics. The apparatus also comprising a processor configured to process the alignment signalling received from the first antenna and determine the location of the second transmitter relative to the apparatus; and generate control signalling representative of the determined location of the second transmitter relative to the apparatus. The apparatus further comprising a user interface configured to provide a user with an indication of the relative location of the second transmitter relative to the apparatus in accordance with the control signalling to allow for the second antenna to be aligned for data exchange with the second transmitter.

16 Claims, 6 Drawing Sheets

(51) Int. Cl.
*G01S 3/04* (2006.01)
*G01S 3/14* (2006.01)
*G01S 13/74* (2006.01)
*H04B 17/00* (2015.01)
*H04B 17/27* (2015.01)
*H04W 4/02* (2009.01)

(56) References Cited

U.S. PATENT DOCUMENTS

| | | |
|---|---|---|
| 2002/0164945 A1 | 11/2002 | Olsen et al. |
| 2007/0037528 A1 | 2/2007 | Doan et al. |
| 2007/0197229 A1 | 8/2007 | Kalliola et al. |
| 2008/0088518 A1* | 4/2008 | Charash et al. ............... 343/757 |
| 2008/0311851 A1* | 12/2008 | Hansen et al. ............... 455/41.2 |
| 2008/0311944 A1* | 12/2008 | Hansen et al. ................ 455/517 |
| 2009/0061795 A1* | 3/2009 | Doan et al. ..................... 455/91 |

FOREIGN PATENT DOCUMENTS

| | | |
|---|---|---|
| CN | 101 465 699 A | 6/2009 |
| EP | 1 150 379 A1 | 10/2001 |

OTHER PUBLICATIONS

Office Action for Chinese Application No. 2009801609940 dated May 6, 2013.

* cited by examiner

APPARATUS AND METHOD FOR ANTENNA ALIGNMENT

This application is a continuation of and claims priority to U.S. application Ser. No. 13/381,319, filed May 15, 2012, which claims priority to PCT Application PCT/EP2009/004728 filed Jun. 30, 2009, the entire contents of which are hereby incorporated by reference.

TECHNOLOGICAL FIELD

The present disclosure relates to the field of apparatus comprising first and second antennas, associated methods, computer programs and user interfaces. Certain disclosed aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed aspects/embodiments may provide one or more audio/text/video communication functions (e.g., tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g., MP3 or other format and/or (FM/AM) radio broadcast recording/playing), downloading/sending of data functions, image capture function (e.g. using a (e.g. in-built) digital camera), and gaming functions.

It will also be appreciated that certain disclosed aspects/embodiments relate to laptop computers, computer peripherals, and any other electronic devices that can exchange data with another electronic device.

BACKGROUND

Recent technological and regulatory development has spurred strong interest in millimetre wave communication applications, for example in the range of 30 GHz to 90 GHz. As one example, large unlicensed frequency bands are being allocated globally for communications at about 60 GHz. The wide available bandwidth gives an opportunity to develop extremely high bit-rate radio communication systems with relatively simple modulation schemes. Data rates of up to 10 Gbps are possible. Atmospheric attenuation at 60 GHz can also reduce interference problems.

US 2007/0037528 (Doan et al) discloses a wireless communication device using adaptive beam forming. The device comprises a radio frequency transmitter having a digitally controlled phased array antenna coupled to and controlled by a processor to transmit content using adaptive beam forming. The device also has an interface to a wireless communication channel coupled to the processor to communicate antenna information relating to the use of the phased array antenna and to communicate information to facilitate playing the content at another location.

US 2007/0197229 (Kalliola et al) discloses a system for indicating the relative direction of a target object or location as determined from the current position of a wireless communication device.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

BRIEF SUMMARY

In a first aspect, there is provided an apparatus comprising:
  a first antenna configured to receive alignment signalling from a first transmitter over a first communication channel, the first communication channel having a first set of characteristics;
  a second antenna configured to exchange data with a second transmitter over a second communication channel, the second communication channel having a second different set of characteristics;
  a processor configured to:
    process the alignment signalling received from the first antenna and determine the location of the second transmitter relative to the apparatus; and
    generate control signalling representative of the determined location of the second transmitter relative to the apparatus; and
  a user interface configured to provide a user with an indication of the relative location of the second transmitter relative to the apparatus in accordance with the control signalling to allow for the second antenna to be aligned for data exchange with the second transmitter.

A user can manipulate the apparatus in accordance with the indication of the relative location of the second transmitter relative to the apparatus in order to provide for the data exchange with the second transmitter. This can provide a convenient user interface for a user to be able to exchange data with the second transmitter, even if the second transmitter is not visible to a user. In such examples, it may not have been possible/convenient for a user to be able to align their device with the second transmitter using the prior art. The apparatus may be easy for a user to use and exchange data with a transmitter without requiring particular technical expertise.

The different characteristics of the first and second communication channels can be utilised to provide an efficient and economical apparatus. For example, communication channels and corresponding antennas/transmitters that have characteristics that are appropriate for their purpose, including the power consumed by the apparatus, can be used in order to improve performance of the apparatus.

It will be appreciated that exchanging data between the apparatus and the second transmitter may be unidirectional (in either one direction) or bidirectional. Similarly, it will be appreciated that any transmitter described herein could also be a transceiver, that is, the transmitter could also be operable as a receiver.

The user interface may comprise a display configured to provide a user with a graphical indication of the relative direction to the second transmitter from the apparatus. For example, the graphical indication may be a pointing arrow that can represent a direction in two or three dimensions. In other examples, different types of user interface can be used to provide a user with an indication of the relative direction, including an audible indication and/or an indicator that a user can feel/touch.

The first and second transmitters may have relative locations which are associated with one another. For example, the relative location between the first and second transmitters may be known, or may be derivable from the alignment signalling, and may be taken into account when determining the relative direction to the second transmitter based on alignment signalling received from the first transmitter.

The first set of characteristics of the first communication channel may be defined by one or more from the group comprising:

a low data rate communication channel, which may be lower than the data rate associated with the second communication channel;

a wide field of view/beamwidth, which may be wider than the field of view/beamwidth associated with the second communication channel; a low frequency RF signal, which may a be lower frequency than the frequency associated with the second communication channel;

a low power consumption, which may be lower than the power consumption associated with exchanging data over the second communication channel;

functionality to provide digital signal processing at carrier frequency; and high tolerance for losing line of sight between the first antenna and the first transmitter, the tolerance for losing line of sight over the first communication channel may be greater than the tolerance associated with the second communication channel.

The second set of characteristics of the second communication channel may be defined by one or more from the group comprising:

a high data rate communication channel, which may be higher than the data rate associated with the second communication channel;

a narrow field of view/beamwidth, which may be more narrow than the field of view/beamwidth associated with the second communication channel; a high frequency RF signal, which may be a higher frequency than the frequency associated with the second communication channel; and a high power consumption, which may be higher than the power consumption associated with exchanging data over the second communication channel.

The first and second transmitters may be co-located. The processor may be configured to control the direction of the second directional antenna such that it is aligned with the determined relative direction to the first transmitter if it is within the field of view of the second antenna. That is, the relative direction from the apparatus to the first transmitter may be considered to be the same as the relative direction to the second transmitter, or considered as close enough that data can be exchanged between the apparatus and the transmitters.

The first and second transmitters may be configured to have different locations but have relative locations which can still be associated with one another. In such a case, the alignment signalling transmitted over the first communication channel may provide for determination of the relative location of the second transmitter by utilising data relating to the location of the second transmitter relative to the first transmitter.

The first and second antennas may be configured from the same antenna element or elements.

The first antenna may be a directional antenna and/or the second antenna may be a directional antenna. The second antenna may be configured to exchange data with the second transmitter automatically, for example by the processor being configured to control the directionality of the second antenna in accordance with the determined relative direction to the second transmitter from the apparatus.

The first antenna may comprise one or more phased array antennas. The number and/or type of phased antenna arrays that are used may be selected in accordance with a desired field of view of the first antenna, for example a 180 degree field of view may be desired. The desired field of view of the first antenna can represent the degree to which the apparatus is pointing towards the first transmitter in order that feedback can be provided to the user via the user interface to enable data exchange with the second transmitter. In some examples a first antenna having a 360 degree field of view may be provided so that the apparatus can always provide a user with feedback as to how to align the apparatus with the second transmitter in order to be able to exchange data.

The first communication channel may be selected from the group comprising:

a 2.4 GHz wireless local area network (WLAN) channel; and a Bluetooth channel.

The first antenna may comprise a plurality of omni-directional antennas, for example antennas associated with Bluetooth or WLAN applications. The first communication channel may take advantage of the properties of an antenna that is already present in a device associated with the apparatus. For example, an existing antenna can be used as part of the first antenna for receiving the alignment signalling.

The second communication channel may be selected from the group comprising:

a wireless local area network (WLAN) channel with a frequency in the range of about 30 GHz to about 90 GHz; and a 60 GHz wireless local area network (WLAN) channel.

It will be appreciated that the exact frequency of the communication channel is not an essential feature of the invention in some embodiments, and that the second communication channel can have any characteristics, including any frequency, that provides for adequate data exchange.

The second communication channel may enable a high rate of data exchange, for example to provide high-speed wireless internet access, or any other high-speed data downloads or uploads.

The second communication channel may be a narrow-beam communication channel. This may be advantageous as power may not be wasted by transmitting, or attempting to receive, data at a high frequency/data rate over a large field of view. This can improve the efficiency of devices with which the apparatus is associated.

The second communication channel may provide a unidirectional data link from the second transmitter to the second antenna, a unidirectional data link from the second antenna to the second transmitter, or a bidirectional data link between the second transmitter and the second antenna.

Similarly, the first communication channel may provide a unidirectional data link from the first transmitter to the first antenna, a unidirectional data link from the first antenna to the first transmitter, or a bidirectional data link between the first transmitter and the first antenna.

The alignment signalling may comprise one or more of:

transmitter identification data;

timing and/or synchronisation data;

connection initialisation data; and an un-modulated waveform, including a sinusoidal waveform.

According to a further aspect, there is provided an apparatus comprising:

a first transmitter configured to transmit alignment signalling to a first antenna over a first communication channel, the first communication channel having a first set of characteristics; and a second transmitter configured to exchange data with a second antenna over a second communication channel, the second communication channel having a second different set of characteristics.

The first transmitter may be a Bluetooth low energy beacon that is configured to transmit a signal that conveys direction and the access points name.

There may be provided a device comprising any apparatus disclosed herein.

There may be provided a module for a device, the module comprising any apparatus disclosed herein.

There may be provided a system comprising:

a first apparatus and second apparatus, the first apparatus comprising:

a first antenna configured to receive alignment signalling from a first transmitter of the second apparatus over a first communication channel, the first communication channel having a first set of characteristics;

a second antenna configured to exchange data with a second transmitter of the second apparatus over a second communication channel, the second communication channel having a second different set of characteristics;

a processor configured to:

process the alignment signalling received from the first antenna and determine the location of the second transmitter relative to the first apparatus; and generate control signalling representative of the determined location of the second transmitter relative to the first apparatus; and a user interface configured to provide a user with an indication of the relative location of the second transmitter relative to the apparatus in accordance with the control signalling to allow for the second antenna to be aligned for data exchange with the second transmitter;

the second apparatus comprising:

a first transmitter configured to transmit alignment signalling to the first antenna of the first apparatus over the first communication channel; and a second transmitter configured to exchange data with the second antenna over the second communication channel.

According to a further aspect, there is provided a method of exchanging data between an apparatus and a transmitter/transceiver comprising:

receiving alignment signalling at the apparatus from a first transmitter of the transmitter/transceiver over a first communication channel, the first communication channel having a first set of characteristics;

processing the alignment signalling and determining a location of a second transmitter of the transmitter/transceiver relative to the apparatus;

generating control signalling representative of the determined location of the second transmitter relative to the apparatus;

providing a user with an indication of the location of the second transmitter relative to the apparatus in accordance with the control signalling to allow for the second antenna to be aligned for data exchange with the second transmitter; and exchanging data between the apparatus and the second transmitter of the transmitter/transceiver over a second communication channel.

The method may further comprise a user adjusting the physical orientation of the apparatus in accordance with the indication of the location of the second transmitter relative to the apparatus.

According to a further aspect, there is provided a method of exchanging data between a transmitter and an apparatus comprising:

transmitting alignment signalling from the transmitter to a first antenna of the apparatus over a first communication channel, the first communication channel having a first set of characteristics; and exchanging data between the transmitter and a second antenna of the apparatus over a second communication channel, the second communication channel having a second different set of characteristics.

According to a further aspect, there is provided a computer program, recorded on a carrier, the computer program comprising computer code configured to provide any method disclosed herein; or configure any apparatus disclosed herein.

There may also be provided a computer-readable storage medium having stored thereon a data structure configured to provide any method disclosed herein; or configure any apparatus disclosed herein.

There may be provided a computer program product comprising a computer-readable medium bearing computer program code embodied therein for use with a computer, the computer program code comprising:

code for receiving alignment signalling at the apparatus from a first transmitter of the transmitter over a first communication channel, the first communication channel having a first set of characteristics;

code for processing the alignment signalling and determining a location of a second transmitter of the transmitter relative to the apparatus code for generating control signalling representative of the determined location of the second transmitter relative to the apparatus;

code for providing a user with an indication of the location of the second transmitter relative to the apparatus in accordance with the control signalling to allow for the second antenna to be aligned for data exchange with the second transmitter; and code for exchanging data between the apparatus and the second transmitter of the transmitter over a second communication channel.

There may be provided a computer program product comprising a computer-readable medium bearing computer program code embodied therein for use with a computer, the computer program code comprising:

code for transmitting alignment signalling from the transmitter to a first antenna of the apparatus over a first communication channel, the first communication channel having a first set of characteristics; and code for exchanging data between the transmitter and a second antenna of the apparatus over a second communication channel, the second communication channel having a second different set of characteristics.

A computer-readable medium encoded with instructions that, when executed by a computer, perform:

receiving alignment signalling at an apparatus from a first transmitter of a transmitter over a first communication channel, the first communication channel having a first set of characteristics;

processing the alignment signalling and determining a location of a second transmitter of the transmitter relative to the apparatus;

generating control signalling representative of the determined location of the second transmitter relative to the apparatus;

providing a user with an indication of the location of the second transmitter relative to the apparatus in accordance with the control signalling to allow for the second antenna to be aligned for data exchange with the second transmitter; and exchanging data between the apparatus and the second transmitter of the transmitter over a second communication channel.

A computer-readable medium encoded with instructions that, when executed by a computer, perform:

transmitting alignment signalling from the transmitter to a first antenna of the apparatus over a first communication channel, the first communication channel having a first set of characteristics; and exchanging data between the transmitter and a second antenna of the apparatus over a second communication channel, the second communication channel having a second different set of characteristics.

There may be provided electronic distribution of any computer program or software disclosed herein.

There may be provided a method of assembling any apparatus or device disclosed herein.

There may be provided apparatus for a means for exchanging data between an apparatus and a transmitter/transceiver comprising:

means for receiving alignment signalling at the apparatus from a first transmitter of the transmitter/transceiver over a first communication channel, the first communication channel having a first set of characteristics;

means for processing the alignment signalling and determining a location of a second transmitter of the transmitter/transceiver relative to the apparatus means for generating control signalling representative of the determined location of the second transmitter relative to the apparatus;

means for providing a user with an indication of the location of the second transmitter relative to the apparatus in accordance with the control signalling to allow for the second antenna to be aligned for data exchange with the second transmitter; and means for exchanging data between the apparatus and the second transmitter of the transmitter/transceiver over a second communication channel.

There may be provided apparatus for a means for exchanging data between a transmitter/transceiver and an apparatus comprising:

means for transmitting alignment signalling from the transmitter/transceiver to a first antenna of the apparatus over a first communication channel, the first communication channel having a first set of characteristics; and means for exchanging data between the transmitter/transceiver and a second antenna of the apparatus over a second communication channel the second communication channel having a second different set of characteristics.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE DRAWINGS

A description is now given, by way of example only, with reference to the accompanying drawings, in which.

DETAILED DESCRIPTION

One or more embodiments described herein relate to an apparatus having a first antenna and a second antenna for exchanging data with respective transmitters over different communication channels. The first communication channel may be suitable for exchanging alignment signalling so that a user of the apparatus can identify a relative direction to a transmitter with which the apparatus can exchange data over the second communication channel. Examples of data that can be exchanged over the second communication channel include high definition video content, information downloaded from the internet, or any other data that is typically exchanged over a wireless local area network (WLAN).

The user interface may provide an indication of the location of the transmitter relative to the apparatus such that a user can manually align the apparatus for data exchange with the second transmitter over the second communication channel. The relative location can be determined in accordance with the alignment signal received over the first communication channel.

In some examples, the characteristics of the first communication channel that make it suitable for exchange alignment signalling can include a wide beamwidth/field of view, a low frequency, and a low bit-rate, amongst others. Characteristics of the second communication channel that make it suitable for exchanging data can include a high frequency, for example in the range of 30 GHz to 90-GHz, and in one example of the order of 60 GHz, a high bit-rate, and a narrow beamwidth/field of view, amongst others.

It will be appreciated that utilising the different communication channels for the different exchanges of data can provide an efficient and economical apparatus as excessive, unnecessary power consumption for establishing the communication path over the second communication channel can be reduced and/or avoided, and specific characteristics of each of the communication channels can be tailored for the type of data/information that is to be exchanged over that channel.

Figure 1A:
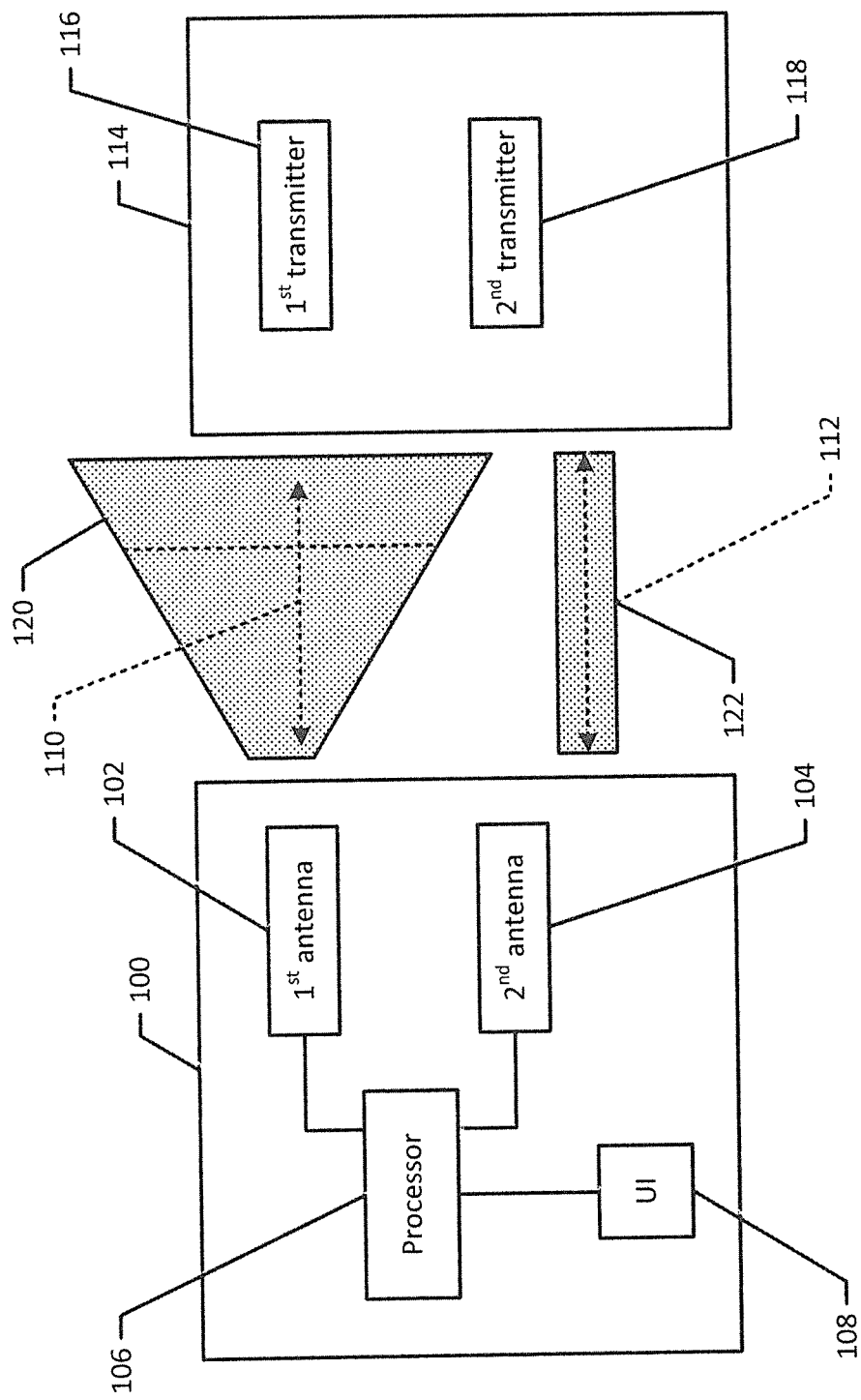
FIGS. 1A and 1B illustrate schematically an apparatus according to an embodiment of the invention.

FIG. 1A illustrates a first data processing apparatus 100 according to an embodiment of the invention. The data processing apparatus 100 may be provided as part of an electronic device (not shown) such as a hand-portable electronic device including a mobile telephone, a personal digital assistant (PDA) or a laptop computer.

FIG. 1A also illustrates a second data processing apparatus 114. In this example, the second data processing apparatus 114 will be referred to as a beacon as it can be configured to transmit data. The use of the word "beacon" should not be construed as limiting the functionality of the second data processing apparatus 114. The beacon 114 may relate to a simple transmitter that is only used for direction finding. In other embodiments, the second data processing apparatus 114 may be a base station, or a handheld portable electronic device, for example. In some examples, the first and second apparatus 100, 114 may be of the same type and may provide for peer-to-peer data exchange.

It will be appreciated that either data processing apparatus 100, 114 independently, or both data processing apparatus 100, 114, together may comprise embodiments of the invention.

The first apparatus 100 comprises a first antenna 102, a second antenna 104 and a user interface 108. The first and second antennas 102, 104 and user interface 108 are in electronic communication with a processor 106.

The first antenna 102, which in this example is a plurality of omni-directional antennas, which can communicate with a first transmitter 116 of the beacon 114, or simply receive data from the first transmitter 116 of the beacon 114, over a first communication channel 110. The omni-directional antennas may comprise antennas that are already present on the apparatus/device such as Bluetooth or WLAN antennas, as well as a set of supplementary antennas that can be switched to measure signal properties and resolve the direction of signals that they receive. Examples of suitable omni-directional antennas can include helicoil antennas and tracked antennas that are provide by tracks on the surface of a printed circuit board (PCB) to define but two examples of many possible options.

The second antenna 104 is configured to exchange data with a second transmitter 118 of the beacon 114 over a second communication channel 112.

In other embodiments, the first antenna 102 may be a directional antenna such as a phased array antenna.

The first and second antennas 102, 104 may form part of associated transceivers of the first apparatus. Similarly, the first and second transmitters 116, 118 may form part of associated transceivers of the beacon 114. As described below, at least the second communication channel 112 may be unidirectional, although any configuration of transmitters/receivers/transceivers may be provided in order to perform the data exchange that is required for embodiments of the invention.

The first transmitter 116 of the beacon 114 transmits alignment signalling over the first communication channel 110 such that the alignment signalling can be received by the first antenna 102. The alignment signalling may be an unmodulated signal, such as a sinusoidal waveform, or may be modulated with data such as transmitter identification data, synchronisation data, connection initialisation data, etc. The purpose of the alignment signalling is so that the apparatus 100 can identify a relative location from the apparatus 100 to the second transmitter 118, and therefore any waveform that can perform this function can be used as the alignment signalling.

In this example, the first antenna 102 has a wide field of view in order to be able to receive the alignment signalling from the first transmitter 116 even if the first antenna 102 is not exactly aligned with the first transmitter 116. The field of view of the first antenna 102 is shown in FIG. 1A as reference 120. The first antenna 102 in this example is configured to receive a low frequency, low bit-rate signal over the first communication channel 110 such as using a 2.4 GHz WLAN or Bluetooth protocol. It will be appreciated that the amount of data that needs to be transferred over the first communication channel 110 is relatively small, and therefore a low bit-rate communication channel may be considered as suitable. In addition, low frequency communication channels often have a larger field of view than high frequency communication channels and therefore may be considered as more suitable for the first communication channel 110.

It will be appreciated that the first antenna 102 may comprise a plurality of phased array antennas in order to provide a required field of view. The phased array antennas may be aligned in one dimension, two dimensions, or three dimensions depending upon the expected use of the apparatus 100, the desired overall field of view and the level of power consumption used by the phased array antennas that is considered acceptable. As an example, the phased array antennas may be provided around one or more sides of the periphery of a device with which the apparatus is associated.

The second antenna 104 can exchange data with the second transmitter 118 over a high frequency, high bit-rate communication channel 112. Typically, such high frequency communication channels have a narrow field of view/beamwidth, and therefore it can be difficult to efficiently align the second antenna 104 with the second transmitter 118. The field of view of the second antenna 104 is shown in FIG. 1A as reference 122. That is, if the second antenna 104 is not accurately pointing towards the second transmitter 118, then may not be possible to exchange data over the second communications channel 112.

In this example, the processor 106 can process the alignment signalling received at the first antenna 102 in order to determine the location of the second transmitter 118 relative to the apparatus 100. This can allow for the second antenna 104 to be aligned with the second transmitter 118 for data exchange over the second communications channel 112.

In this example, the first transmitter 116 and the second transmitter 118 are co-located within the same beacon 114. Therefore, the processor 106 can determine the relative location of the first transmitter 116 relative to the apparatus 100 from the alignment signalling, and use the relative location for the first transmitter 116 as the relative location of the second transmitter 118.

In other embodiments, the first and second transmitters 116, 118 may have relative locations with respect to each other that are known, or can be determined from the alignment signalling. In this way, the processor 116 can determine the relative location of the second transmitter 118 from the apparatus 100 in accordance with a determined relative location of the first transmitter 116.

It will be appreciated to the skilled person that antennas that determine the location of the source of a received signal, such as the alignment signalling received from the first transmitter 116, are well known in the art. For example, a direction-of-arrival calculation can be performed, and an example of a system that can be used to calculate a direction of arrival is shown as FIG. 1B.

Figure 1B:
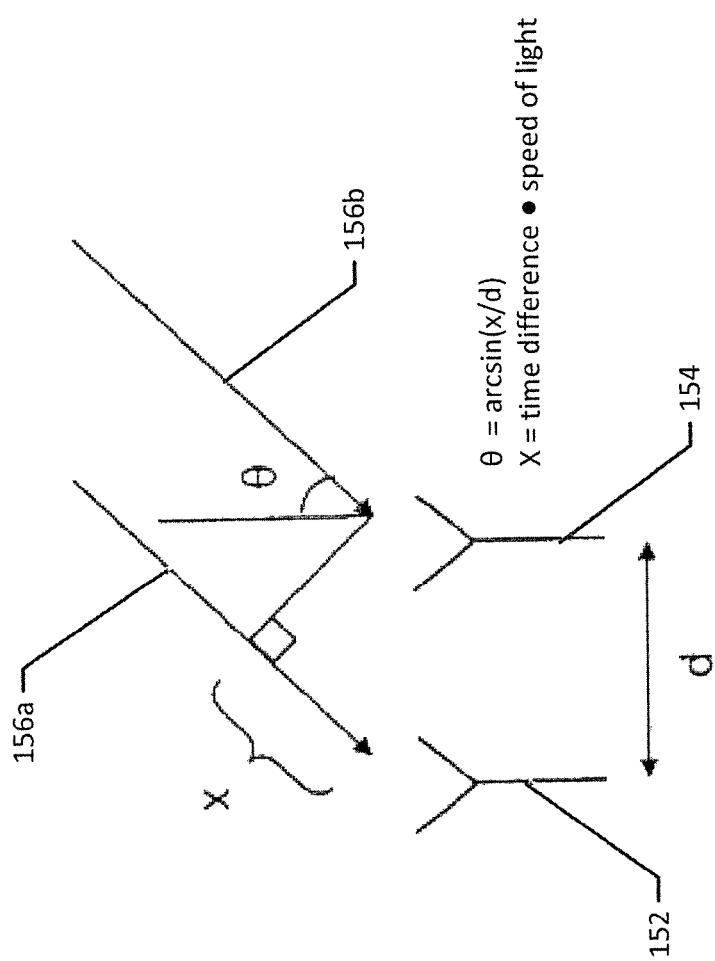

The system of FIG. 1B comprises two antennas 152, 154 that each receives a signal from the same transmitter. The signals received from the transmitter (not shown) are given reference numbers 156a and 156b in FIG. 1B. The phase difference between the signals 156a, 156b received at the two antennas 152, 154 can be calculated by comparing the signals received at the antennas 152, 154. This may be particularly advantageous for band-limited signals. The time difference associated with the calculated phase difference can be multiplied by the speed of light to determine the difference in path length from the transmitter to the two antennas 152, 154. The difference in path length is labelled as x in FIG. 1B. Also, the distance d between the two antennas 152, 154 is known. The angle a from which the signals 156a, 156b were received can then be calculated using mathematics, and in this example, θ can be calculated using the equation:

$$\theta = \arcsin(x/d)$$

It will be appreciated that more than two antennas 152, 154 at different locations can be used to calculate the angle of incidence of the received signals 156a, 156b. The phase difference signalling need only be determined to sufficient accuracy for the second antenna 104 to be able to exchange data with the second transmitter 118. The apparatus 100 may be able to process signals received from the second transmitter to provide further information for determining the location of the second transmitter 118. For example, received signal strength analysis received from the second transmitter 118 may be used to more accurately determine the location of the second transmitter 118.

Use of the first communication channel 110 may be considered as providing coarse direction finding in order for the second antenna 104 and second transmitter 118 to be sufficiently aligned to exchange data over the second communication channel 112. Optionally, the second communication channel 112 may also provide for more accurate direction finding in order for the quality of data exchange to be improved. One or more embodiments of the invention can provide a high quality, in some embodiments optimal, connection for data exchange over the second communication channel.

Other examples of determining the relative direction from which a signal is received that can be used with embodiments of the invention are described in US 2007/0197229 (Kalliola et al).

In some examples, the direction-of-arrival of a radio signal can also be measured in an analogue manner using the radiation pattern of a single receiver antenna, for example by rotating an antenna with a sharp null in the pattern.

Returning to FIG. 1a, the processor 106 generates control signalling for the user interface 108, wherein the control signalling causes the user interface to provide a user with an indication of the relative direction to the second transmitter 118 from the apparatus 100. In one example, the user interface 108 may be a graphical display, and a pointing arrow can be displayed to the user indicative of the relative direction to the second transmitter 118. It will be appreciated that the first and second antennas 102, 104 may have fixed relationships with regard to the apparatus 100 such that the determined relative direction to the second transmitter 118 from the first or second antenna 102, 104 will have the same, or a consistent, relative direction with respect to the user interface 108.

In embodiments where the second antenna 104 is a directional antenna the user interface 108 may be used so that the alignment between the second antenna 104 and the second transmitter 118 is close enough so that the directionality of the antenna 104 can be controlled to allow data exchange. This is because the directionality of the second antenna 104 can be automatically controlled by the processor 106 in order to facilitate the data exchange. In other embodiments, where the second antenna is not directional, or is not directional enough to establish the communication link 112 with the second transmitter, physical manipulation of the apparatus 100 may be required by the user in order for the second antenna 104 and second transmitter 118 to be able to exchange data. For example, the user can move/rotate the apparatus 100 such that the second antenna is pointing in the same direction as the pointing arrow on the display 108.

Figure 2:
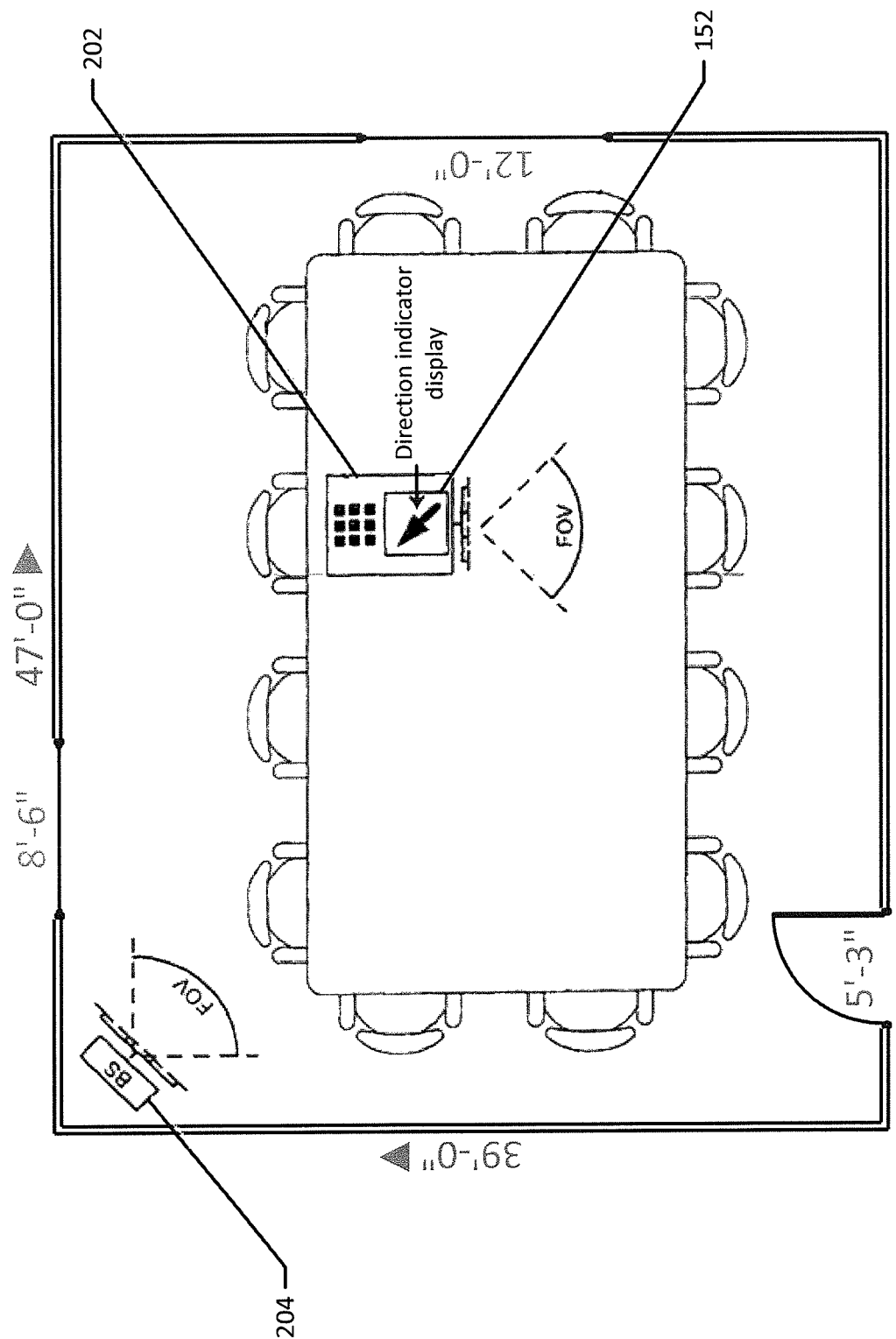
FIG. 2 illustrates schematically an apparatus according to an embodiment of the invention in use.
Figure 5:
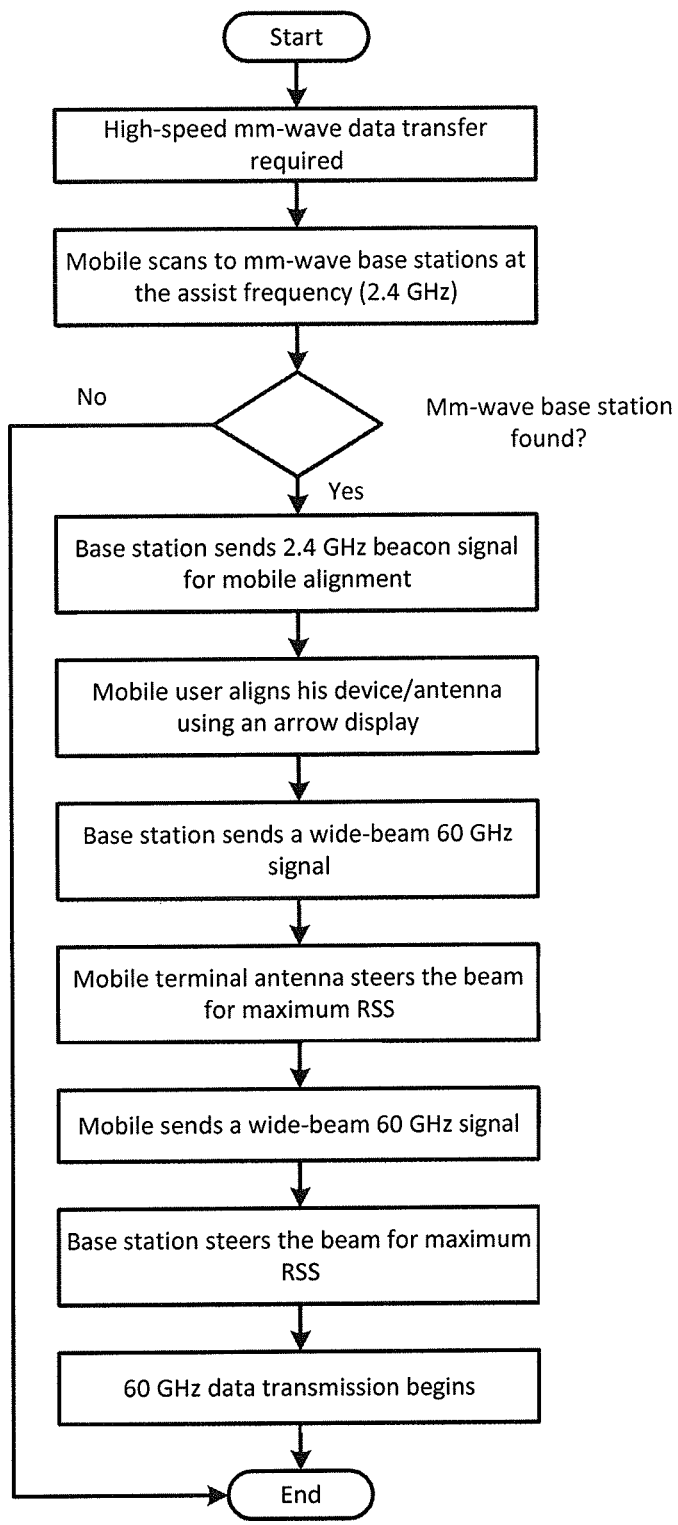
FIG. 5 illustrates schematically a method according to a further embodiment of the invention.

FIG. 2 illustrates schematically an apparatus 202 and a base station 204 according to an embodiment of the invention. The apparatus 202 and base station 204 may be referred to as terminals. The two terminals are setup with high-gain (for example, narrow beam) antennas. In the exemplary implementation both terminals are equipped with an ISM band (2.4 GHz WLAN or Bluetooth) radio. When the need for high speed data transfer at millimeter waves is detected (for example, by detecting the start of a large file download or high-definition uncompressed video streaming), a connection is first established using this 2.4 GHz band radio. Basic data including the mm-wave link type, availability, frequency, device addresses, timing etc. are exchanged. For the initial mobile antenna alignment the base station 204 transmits a 2.4 GHz beacon signal. The mobile user then points his device 202 (or only his antenna) towards the base station 204 using the information from the radio directioning receiver shown on the display 206 of the device 202. The base station 204 then transmits a wide-beam mm-wave signal and the mobile terminal 202 automatically adjusts its narrow mm-wave beam towards the terminal by scanning the field-of-view and determining the direction of the strongest signal. This procedure is then reversed to align the base station antenna beam towards the mobile 202. The 2.4 GHz link can remain active the whole time and be used for controlling the alignment procedure. Once the antenna beams are aligned the data transfer with the mm-wave link can start. A flow diagram of the procedure is shown in FIG. 5, and it will be appreciated that electrically controlled beam forming principles using a planar antenna array are well known in the art.

If the low-frequency direction finding system is accurate enough, the mm-wave antenna beams can be adjusted by using this information only. In such an example, the part of the system using wide mm-wave beams can be omitted. This would simplify the system significantly. Entirely manual antenna pointing could also be possible.

A principle for implementation of the radio direction finding is based on receiving a known signal with an array of receivers. By detecting the phase difference of the signals received at different locations, the angle of incidence can be deduced. The accuracy of the handset implementation can depend on the environment (distance, angle etc.) but is normally in the order of 5-10 degrees. This should be enough for the coarse adjustment of the millimeter-wave antenna. Instead of using an established 2.4 GHz system, dedicated radios and/or other frequencies can be used for the connection assistance.

It will also be appreciated that the concept is not limited to base station—mobile station arrangement, but can be used in cases where the user(s) would like to establish high-rate connection between two mobile devices in case of a direct device-to-device connection. In case of peer-to-peer communications the manual alignment procedure may be performed at both ends whereas in the case of a fixed base station, the antenna field-of-view can cover the required space or several antennas can be used. Furthermore, in some examples the lower frequency link can be used as a fall-back mode for exchanging data that would otherwise be transmitted over the higher frequency link, in case of misalignment of the antennas or shadowing of the devices.

Figure 3:
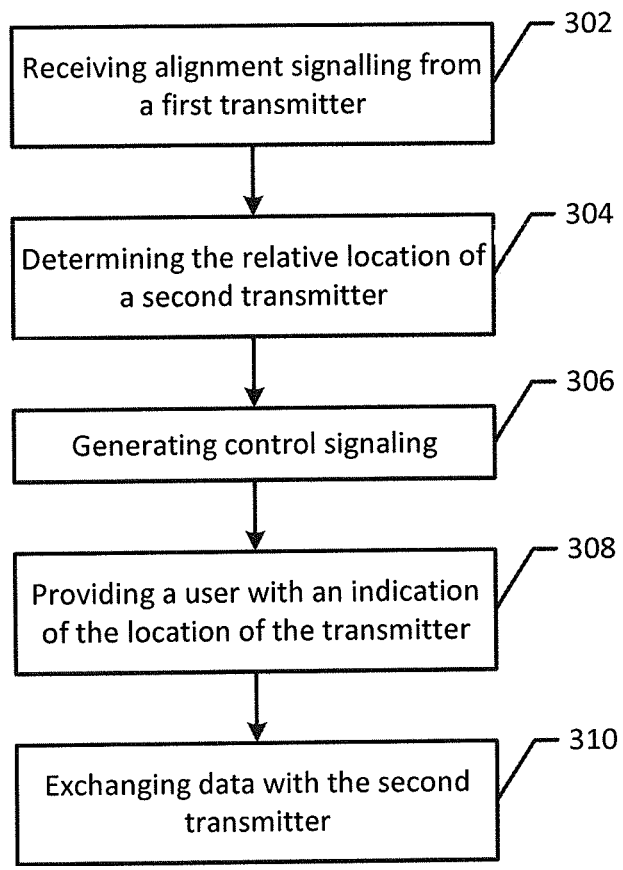
FIG. 3 illustrates schematically a method according to an embodiment of the invention.

FIG. 3 illustrates schematically a process flow for exchanging data according to an embodiment of the invention.

The process begins at step 302 by receiving alignment signalling from a first transmitter. The alignment signalling is received over a first communication channel having a first set of characteristics. Examples of the characteristics of the first communication channel include a low frequency, a low bit-rate, lower power consumption, and a narrow beamwidth, for example.

The method continues at step 304 by determining the relative location of a second transmitter in accordance with the received alignment signalling. Any fixed relationship between the first and second transmitter in terms of location can be taken into account when determining the relative location of the second transmitter.

At step 306, the method comprises generating control signalling representative of the determined location of the transmitter relative to the apparatus. The control signalling being suitable for a user interface.

At step 308, the method comprises providing a user with an indication of the location of the transmitter relative to the apparatus in accordance with the control signalling. This can allow for the second antenna to be aligned for data exchange with the transmitter;

At step 310, the process continues by exchanging data with the second transmitter in accordance with the determined relative location of the second transmitter. This can be performed by automatically controlling/adjusting the directionality of the second antenna and/or by having the physical orientation of the second antenna controlled/adjusted by a user such that the required communication channel is provided for the exchange of data.

Figure 4:
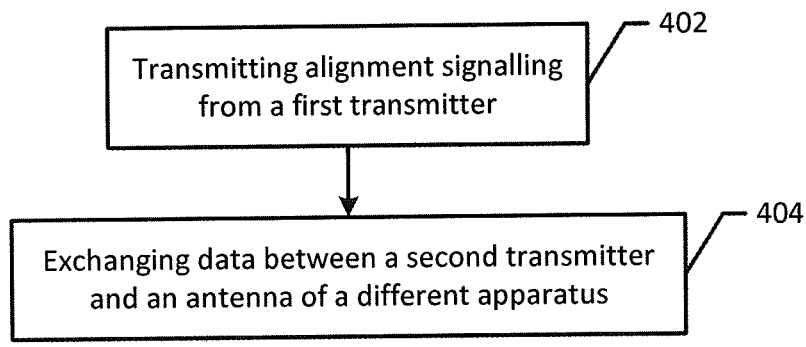
FIG. 4 illustrates schematically a method according to another embodiment of the invention.

FIG. 4 illustrates a process flow according to a further embodiment of the invention, and begins at step 402 by transmitting alignment signalling from a first transmitter. The alignment signalling may be transmitted for receipt by a first antenna of a different data processing apparatus such that the different data processing apparatus can be aligned in accordance with the alignment signalling for data exchange with a second transmitter.

After the second transmitter and an antenna of the different apparatus have been aligned in accordance with the alignment signalling, the process continues by exchanging data between the second transmitter and the antenna of the different apparatus at step 404.

Figure 6:
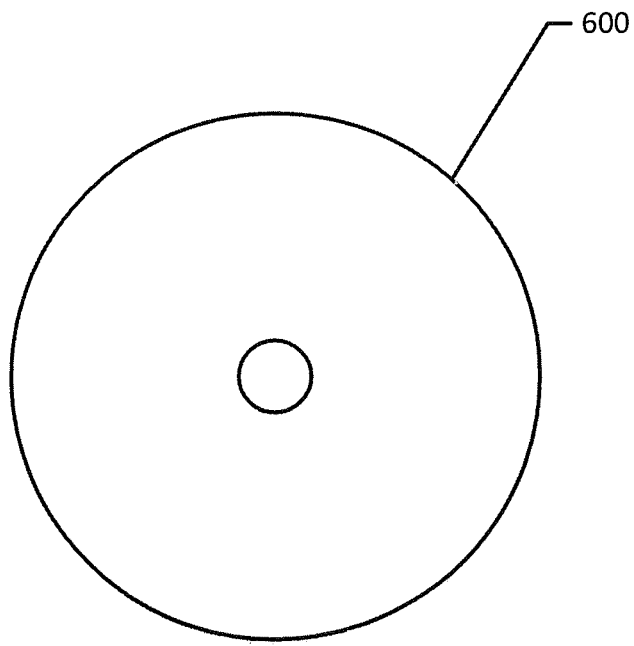
FIG. 6 illustrates schematically a computer readable media providing a program according to an embodiment of the present invention.

FIG. 6 illustrates schematically a computer/processor readable media 600 providing a program according to an embodiment of the present invention. In this example, the computer/processor readable media is a disc such as a digital versatile disc (DVD) or a compact disc (CD). In other embodiments, the computer readable media may be any media that has been programmed in such a way as to carry out an inventive function.

One or more embodiments of the invention are related to radio technology and in particular to high-speed communications using millimeter wave frequency range. A solution is proposed to assist in the initial alignment of millimeter wave narrow-beam antennas to enable the setup of a high-speed communication link and in the control of that link.

Embodiments of the invention can address any issues related to providing line-of-sight propagation combined with a limited link budget, and can address problems with the prior art that require the use of directive antennas to attain reasonable wireless communication distances. Directive antennas may limit the mobility and general usability of the planned systems. Several standards in the 60 GHz frequency range are under development (IEEE 802.15.3c, WGA, ECMA-387, WirelessHD).

It will be appreciated that any electronic device can be used as the second apparatus 114 in FIG. 1A, or the base station 204 in FIG. 2. The apparatus that is used to transmit data may be considered as a "very high speed connection/access point". Under the ECMA standards, the second apparatus 114 of FIG. 1A maybe referred to as a "device" for a PAL personal area network, and it could be a local connection device. In some examples, apparatus according to embodiments of the invention may be referred to by the terms "relay" and "destination" depending on the data traffic flow.

It will also be appreciated that two or more apparatus that each have similar functionality to both the first and second apparatus 100, 114 of FIG. 1A may provide an embodiment of the invention. That is, each apparatus may have both transmit and receive functionality. The two apparatus may be handheld and may provide for peer-to-peer data exchange.

In some examples narrow-beam antennas must be carefully aligned towards each other in order to establish high-speed millimeter wave radio link between two terminals. To ensure a certain level of mobility and usability in the system, one or both of the antennas can be equipped with a steerable beam. For the alignment of one of the beams, it can be helpful to use a wider radiation pattern in the other antenna during this process and then switch to the narrow beam for the high-speed data transfer when better link budget is required. In this way, the narrow-beam antenna can be pointed in the direction of the strongest signal. If narrow beams were used at both ends, it would be very difficult to find the best alignment, and in theory no signal would be received until the two beams would point directly at each other. In a worst case scenario, an exhaustive search with all the possible combinations of beam directions would have to be carried out, consuming a significant amount of time and energy.

In some embodiments, a control link using omni-directional antennas, for example, is first established to synchronize this procedure. Nevertheless, in that case the transmission power needs to be higher to achieve a similar range compared to the case with narrow antenna beams, resulting in higher power consumption and more demanding designs capable of delivering the required power. Even in the omni-directional antenna case, the initial alignment may be done manually to ensure that the terminals are in each other's field of vision, that is, in the range of the steering angle of the narrow beam antennas. This may not always be obvious if the terminals are not easily visible or if there are several terminals and a possibility of confusion. A practical limit for the steering angle of a mm-wave planar phased array antenna, which is one method of implementing a steerable beam, can be ±45 degrees.

According to an embodiment of the invention, a lower frequency system/communication channel is used to assist in the establishing of the primary/higher frequency communication link. At least one or more of the following advantages/features may be provided:

1. Using radio direction finding to locate the other terminal. For example, the lower frequency radio does not only provide Layer 1-3 parameters for the high-frequency radio to set up the link, but also the direction of the device with which the high-frequency link should be established.
   a. This direction can be then shown to the user for better device alignment; or
   b. It can be used automatically to steer the antenna beams without user intervention; or
   c. A combination of a. and b. A certain degree of manual device alignment is likely to be required even with automatically steerable beam, as only a portion of 360° may be covered by automatic beam steering.

2. Low-data rate signaling to control and synchronise the terminals.

3. To provide only the other link direction (i.e., uplink or downlink) in case of asymmetric data transfer requirement.

In some examples, the lower frequency radio may be an existing system such as Wireless LAN, although it can also be a dedicated system. Radio direction finding systems using 2.4 GHz WLAN or Bluetooth signals that are suitable for use with embodiments of the invention are known, for example in US 2007/0197229.

Further advantages can include:

The initial alignment of the mobile terminal antenna can be done without prior knowledge of the location of the other antenna. This may be especially useful if the other antenna is obscured from view, for example in a ceiling cavity.

The low-frequency link can provide a control channel to synchronize the procedure of fine adjustment of the antenna beams and initializing the connection.

In case of asymmetric data transfer requirements, millimeter wave link is needed only in one direction if the additional low-frequency radio is used as the return link.

Direction finding processing using 2.4 GHz radios may be a standard feature in mobile devices to provide direction finding applications to the users as there are plans to embed the functionality to all Bluetooth chips. Therefore, the same radio can be used for both direction finding for those particular applications as well as finding both devices and their antenna field of views in case of mm-wave links.

If the lower frequency link is used as a fall-back mode, the reliability of the data transfer is improved. The low frequency mode may provide information that enables the user to resume data transfer (e.g., in case of large data file) even if the mm-wave link breaks down.

Embodiments of the invention may require algorithmic support from a radio chip associated with the apparatus, as well as a multi-antenna element with switching capabilities in some examples.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g., switched on, or the like. In such cases, they may not necessarily have the appropriate software loaded into the active memory in the non-enabled (e.g., switched off state) and only load the appropriate software in the enabled (e.g., on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be preprogrammed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that the any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g., memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g., including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

That Which is claimed:

1. An apparatus comprising:
    a first antenna configured to receive alignment signalling from a first transmitter over a first communication channel, the first communication channel having a first set of characteristics;
    a second antenna configured to exchange data with a second transmitter over a second communication channel, the second communication channel having a second different set of characteristics, wherein the first antenna comprises multiple antennas, the multiple antennas configured to measure the phase of the alignment signaling;
a processor configured to:
process the alignment signalling received from the first antenna and determine the location of the second transmitter relative to the apparatus by calculating an angle of incidence of the alignment signaling using one or more phase measurement differences between the alignment signaling received at the multiple antennas of the first antenna; and
generate control signalling representative of the determined location of the second transmitter relative to the apparatus; and
a user interface configured to provide a user with an indication of the relative location of the second transmitter relative to the apparatus in accordance with the control signalling to allow for the second antenna to be aligned for data exchange with the second transmitter; and
wherein the processor is configured to process signaling received from the second transmitter over the second communication channel to enable a more accurate determination of the location of the second transmitter relative to the apparatus; and
the first antenna is configured to exchange data with the first transmitter over the first communication channel as a fall-back in the event that data exchange between the second antenna and second transmitter over the second communication channel is inhibited.

2. The apparatus of claim 1, wherein the user interface comprises a display configured to provide a user with a graphical indication of the relative direction to the second transmitter from the apparatus.

3. The apparatus of claim 1, wherein the first set of characteristics of the first communication channel are defined by one or more from the group comprising:
a lower data rate than the data rate associated with the second communication channel;
a wider field of view than the field of view associated with the second communication channel;
a lower frequency RF signal than the frequency associated with the second communication channel;
a lower power consumption than the power consumption associated with exchanging data over the second communication channel;
functionality to provide digital signal processing at carrier frequency; and
higher tolerance for losing line of sight between the first antenna and the first transmitter than the tolerance for losing line of sight over the second communication channel.

4. The apparatus of claim 1, wherein the second set of characteristics of the second communication channel are defined by one or more from the group comprising:
a higher data rate than the data rate associated with the first communication channel;
a narrower field of view than the field of view associated with the first communication channel;
a higher frequency RF signal than the frequency associated with the first communication channel; and
a higher power consumption than the power consumption associated with exchanging data over the first communication channel.

5. The apparatus of claim 1, wherein the first and second transmitters are co-located, and the processor is configured to control the direction of the second antenna such that it is aligned with the determined relative direction to the first transmitter.

6. The apparatus of claim 1, wherein the second antenna is a directional antenna, and the processor is configured to control the directionality of the second antenna in accordance with the determined relative direction to the second transmitter from the apparatus.

7. The apparatus of claim 1, wherein the first communication channel is selected from the group comprising:
a 2.4GHz wireless local area network (WLAN) channel; and
a Bluetooth channel.

8. The apparatus of claim 1, wherein the second communication channel is selected from the group comprising:
a wireless local area network channel with a frequency in the range of about 30GHz to about 90GHz; and
a 60GHz wireless local area network channel.

9. The apparatus of claim 1, wherein the alignment signalling comprises one or more of:
transmitter identification data;
synchronisation data;
connection initialisation data;
an un-modulated waveform.

10. A method of allowing for exchanging of data between an apparatus and one or more of a first transmitter and a second transmitter, the method comprising:
receiving alignment signalling at the apparatus via a first antenna of the apparatus from the first transmitter over a first communication channel, the first communication channel having a first set of characteristics, wherein the first antenna comprises multiple antennas, the multiple antennas configured to measure the phase of the alignment signaling;
processing the alignment signalling and calculating the location of the second transmitter relative to the apparatus by calculating an angle of incidence of the alignment signaling using one or more phase measurement differences between the alignment signaling received at the multiple antennas of the first antenna;
generating control signalling representative of the determined location of the second transmitter relative to the apparatus; and
providing a user with an indication of the location of the second transmitter relative to the apparatus in accordance with the control signalling to allow for the second antenna of the apparatus to be aligned for data exchange with the second transmitter over a second communication channel, the second communication channel having a second different set of characteristics to the first communication channel; and
wherein the method further comprises processing signaling received from the second transmitter over the second communication channel to enable a more accurate determination of the location of the second transmitter relative to the apparatus; and
exchanging data between the first antenna and the first transmitter over the first communication channel as a fall-back in the event that data exchange between the second antenna and second transmitter over the second communication channel is inhibited.

11. A computer-readable non-transitory storage medium comprising a computer program, the computer program comprising computer code configured to, when executed on a processor, provide the method of claim 10.

12. An apparatus according to claim 1, wherein the first antenna and the second antenna are configured to exchange data with the first transmitter and the second transmitter simultaneously.

13. The apparatus of claim 1, wherein the apparatus is configured to allow the second antenna to be user-manipulated to be aligned for data exchange with the second transmitter.

14. The apparatus of claim 1, wherein the first communication channel has a first set of alignment characteristics suitable for coarse alignment.

15. A system comprising:
a first apparatus, the first apparatus comprising:
   a first antenna configured to receive alignment signalling from a first transmitter over a first communication channel, the first communication channel having a first set of characteristics, wherein the first antenna comprises multiple antennas, the multiple antennas configured to measure the phase of the alignment signaling;
   a second antenna configured to exchange data with a second transmitter over a second communication channel, the second communication channel having a second different set of characteristics;
   a processor configured to:
      process the alignment signalling received from the first antenna and determine the location of the second transmitter relative to the apparatus by calculating an angle of incidence of the alignment signaling using one or more phase measurement differences between the alignment signaling received at the multiple antennas of the first antenna; and
      generate control signalling representative of the determined location of the second transmitter relative to the apparatus; and
   a user interface configured to provide a user with an indication of the relative location of the second transmitter relative to the apparatus in accordance with the control signalling to allow for the second antenna to be aligned for data exchange with the second transmitter; and
a second apparatus, the second apparatus comprising the first and second transmitters; wherein:
   the first apparatus is one or more of an electronic device, a portable electronic device, a mobile telephone, a personal digital assistant, a laptop computer, and a module for one or more of the same, and
   the second apparatus is one or more of a beacon, a base station, a portable electronic device, and a module for one or more of the same.

16. An apparatus comprising at least one processor and at least one memory including computer program code, the at least one memory and the computer program code configured to, with the processor, cause the apparatus to at least:
   process alignment signaling received from a first antenna, wherein the first antenna is configured to receive the alignment signaling from a first transmitter over a first communication channel having a first set of characteristics, the first antenna comprising multiple antennas configured to measure a phase of the alignment signaling;
   determine a location of a second transmitter, associated with the first transmitter, by calculating an angle of incidence of the alignment signaling using one or more phase measurement differences between the alignment signaling received at the multiple antennas of the first antenna, wherein the second transmitter is configured to exchange data with a second antenna over a second communication channel, the second communication channel having a second different set of characteristics;
   generate control signaling representative of the determined location of the second transmitter; and
   provide a user with an indication, using a user interface, of the relative location of the second transmitter relative to an apparatus comprising the user interface in accordance with the control signaling to allow for the second antenna to be aligned for data exchange with the second transmitter; and
   wherein the apparatus is further caused to process signaling received from the second transmitter over the second communication channel to enable a more accurate determination of the location of the second transmitter relative to the apparatus; and
   the first antenna is configured to exchange data with the first transmitter over the first communication channel as a fall-back in the event that data exchange between the second antenna and second transmitter over the second communication channel is inhibited.

* * * * *